United States Patent
Uemura (10) Patent No.: US 7,987,715 B2
(45) Date of Patent: Aug. 2, 2011

(54) ANGULAR SPEED SENSOR (75) Inventor: Takeshi Uemura, Osaka (JP)

(73) Assignee: Panasonic Corporation, Osaka (JP)

( * ) Notice: Subject to any disclaimer, the term of this patent is extended or adjusted under 35 U.S.C. 154(b) by 614 days.

(21) Appl. No.: 12/097,968

(22) PCT Filed: Dec. 22, 2006

(86) PCT No.: PCT/JP2006/325589
§ 371 (c)(1),
(2), (4) Date: Jun. 18, 2008

(87) PCT Pub. No.: WO2007/074726
PCT Pub. Date: Jul. 5, 2007

(65) Prior Publication Data
US 2009/0288487 A1 Nov. 26, 2009

(30) Foreign Application Priority Data
Dec. 28, 2005 (JP) .................................. 2005-377936

(51) Int. Cl.
*G01C 19/56* (2006.01)
(52) U.S. Cl. .................................................... 73/504.16
(58) Field of Classification Search ............... 73/504.12, 73/504.16, 504.04
See application file for complete search history.

(56) References Cited

U.S. PATENT DOCUMENTS
7,673,529 B2 * 3/2010 Uemura ..................... 73/504.16

FOREIGN PATENT DOCUMENTS
| EP | 1 367 367 A1 | 12/2003 |
| JP | 03-172712 | 7/1991 |
| JP | 2002-243451 | 8/2002 |
| JP | 2002-267448 A | 9/2002 |
| JP | 2003-087057 | 3/2003 |

OTHER PUBLICATIONS
International Search Report Dated Feb. 6, 2007.
Machine Translation of JP 2003-087057, submitted in Information Disclosure Statement dated Jun. 18, 2008.

* cited by examiner

*Primary Examiner* — John Chapman, Jr.
(74) *Attorney, Agent, or Firm* — Pearne & Gordon LLP (57) ABSTRACT

An angular velocity sensor includes a vibrator vibrating, first and second differential circuits for outputting first and second difference signals, respectively, and a synchronous detector circuit for synchronously detecting the first and second difference signals. First and second sensors outputs first and second detection signals in response to a distortion produced due to an inertial force. The second detection signal has a phase reverse to a phase of the first detection signal. The first difference signal corresponds to a difference provided by subtracting the first detection signal from the second detection signal. The second difference signal corresponds to a difference provided by subtracting the second detection signal from the first detection signal. This angular velocity sensor detects an angular velocity of the vibrator accurately.

5 Claims, 7 Drawing Sheets

ANGULAR SPEED SENSOR

TECHNICAL FIELD

The present invention relates to an angular velocity sensor.

BACKGROUND ART

Figure 5:
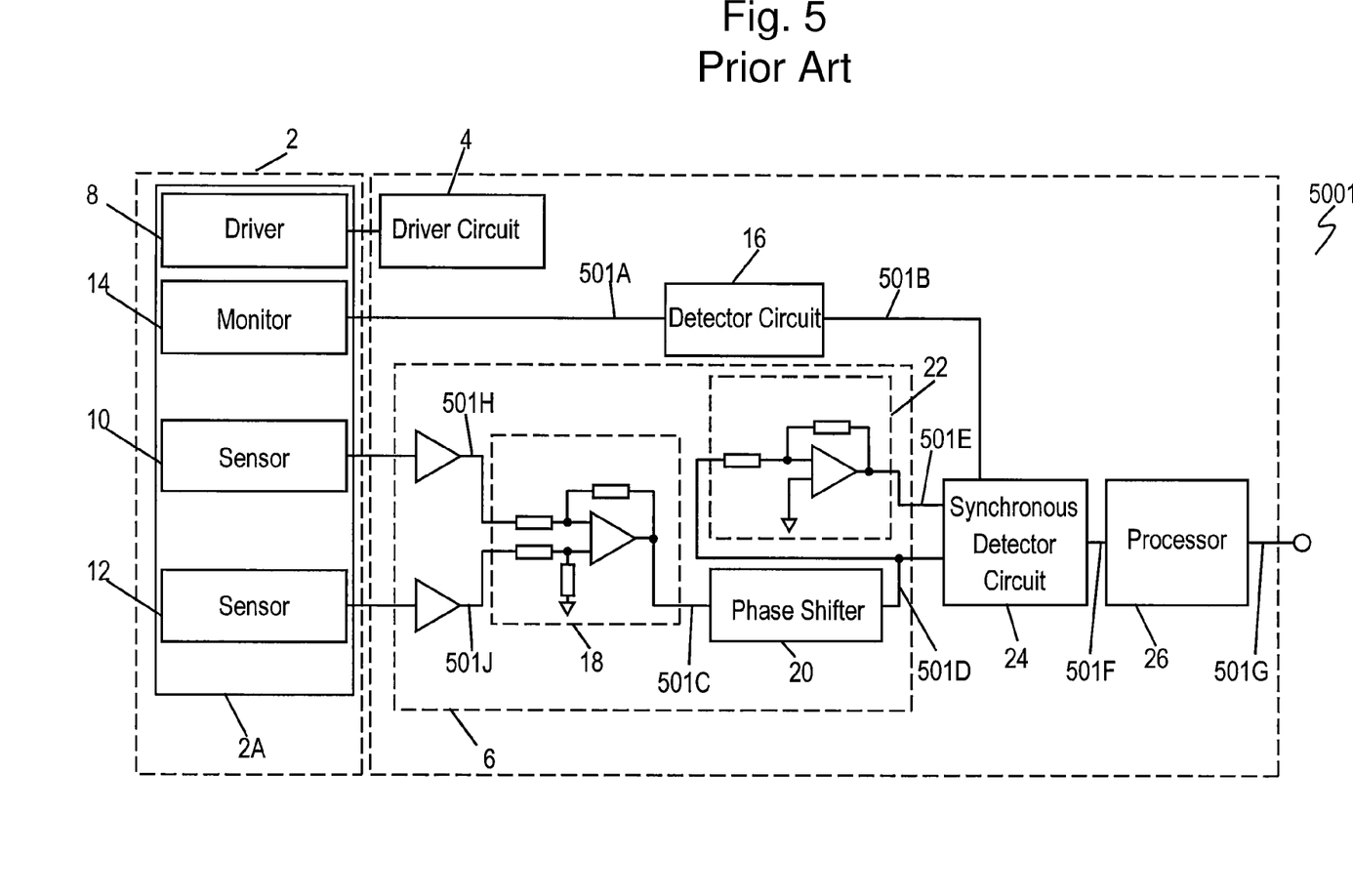
FIG. 5 is a block diagram of a conventional angular velocity sensor.
Figure 6:
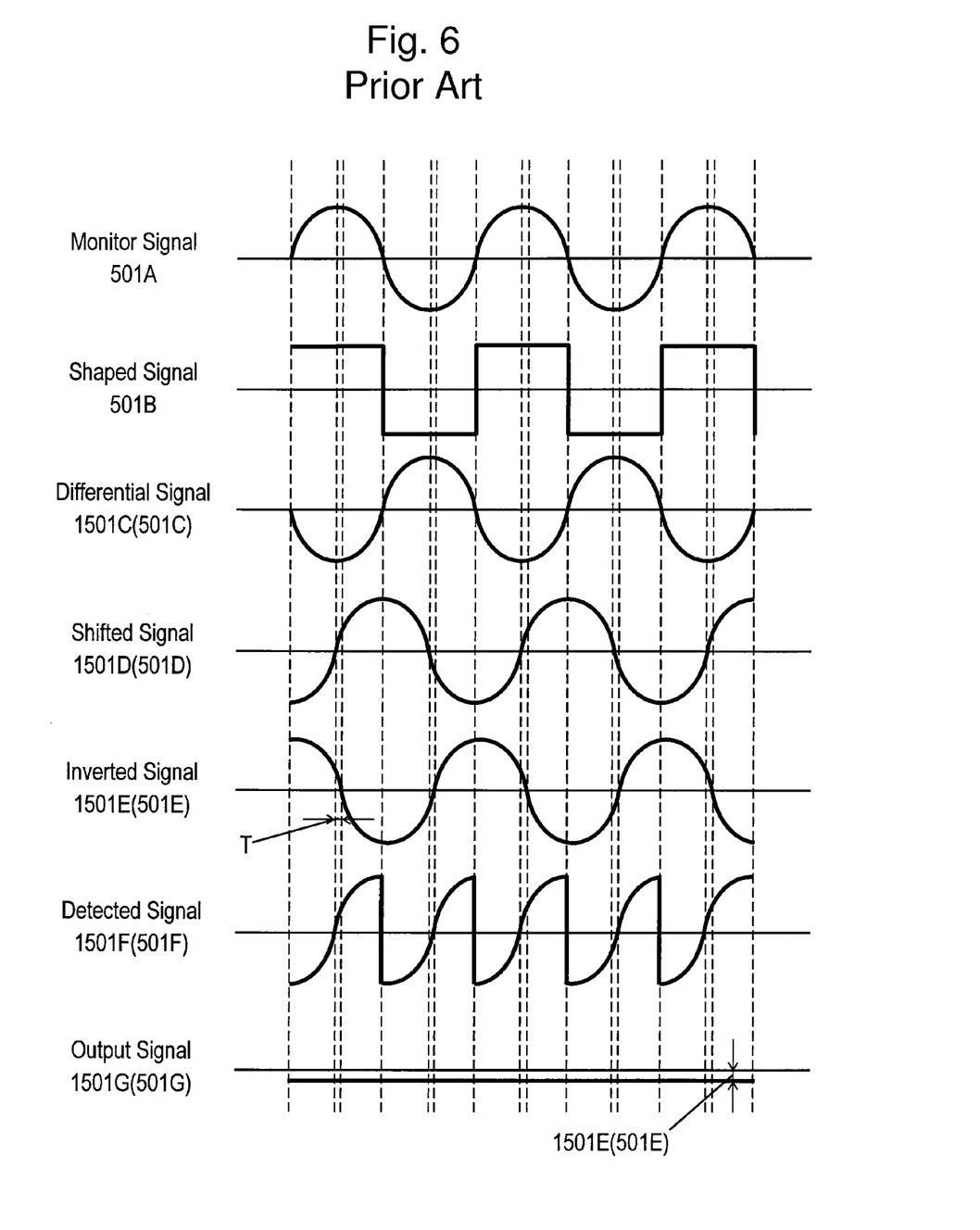
FIG. 6 illustrates the waveforms of signals of the conventional angular velocity sensor.
Figure 7:
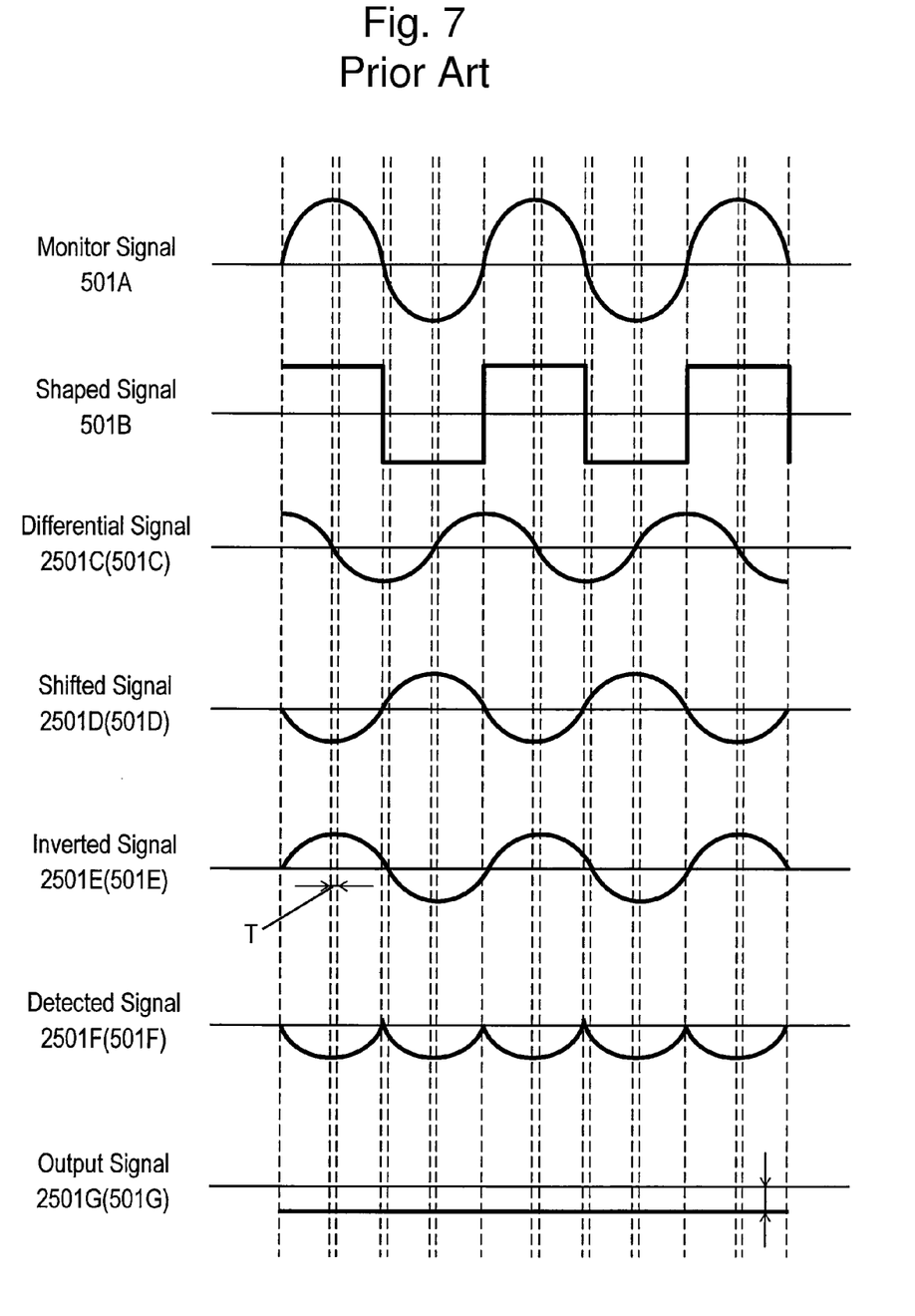
FIG. 7 illustrates the waveforms of signals of the conventional angular velocity sensor.

FIG. 5 is a block diagram of a conventional angular velocity sensor 5001 disclosed in Japanese Patent Laid-Open Publication No. 2002-243451 (Patent Document 1). FIGS. 6 and 7 illustrate the waveforms of signals in the angular velocity sensor 5001. The angular velocity sensor 5001 includes a vibrator 2, a driver circuit 4 for driving the vibrator 2, and a detector 6 for detecting distortions produced in the vibrator 2. The vibrator 2 has any of various shapes, such as a tuning-fork shape, an H-shape, a T-shape, and a reed shape. Upon vibrating and rotating, a Coriolis force (an inertial force) is generated. The Coriolis force provides the vibrator 2 with a distortion. The distortion is electrically detected to calculate the angular velocity of the vibrator 2.

The vibrator 2 includes a vibrator element 2A mechanically vibrating, and a driver 8, a monitor 14, and sensors 10 and 12 which are provided at the vibrator element 2A. The driver 8 causes the vibrator 2 (the vibrator element 2A) to vibrate upon receiving a driving signal from the driver circuit 4. The sensors 10 and 12 outputs the distortion produced in the vibrator element 2A due to the Coriolis force resulting from the rotation of the vibrator element 2A as detection signals 501H and 501J, respectively. The monitor 14 detects the status of the vibration of the vibrator element 2A, and output the status as a monitor signal 501A. The detector 6 shapes the monitor signal 501A into a square waveform and outputs a shaped signal 501B.

The detection signals 501H and 501J generally contain distortion components representing the distortion produced in the vibrator 2 due to the Coriolis force and noise components. In the angular velocity sensor 5001, the noise components are removed from the detection signals 501H and 501J while only the distortion components are taken and used to calculate the angular velocity.

FIG. 6 illustrates the waveforms of the signals 501A and 501B and signals 1501C to 1501G which are carried in the noise components of the angular sensor 5001. FIG. 7 illustrates the waveforms of the signals 501A and 501B and signals 2501C to 2501G which are carried in the distortion components of the angular sensor 5001. The sums of the signals 1501C to 1501G and the signals 2501C to 2501G are denoted by signals 501C to 501G, respectively.

The detection signals 501H and 501J output from the sensors 10 and 12 are input to a differential amplifier 18. The differential amplifier 18 outputs a difference signal 501C, the difference between the signals 501H and 501J. A phase shifter 20 provides a shifted signal 501D by causing the difference signal 501C to shift (delay) in phase by 90 degrees. An inverter amplifier 22 inverts the shifted signal 501D to provide an inverted signal 501E.

A synchronous detector 24 synchronously detects the shifted signal 501D and the inverted signal 501E with reference to the shaped signal 501B as to output a detected signal 501F. A processor 26 smoothes the detected signal 501F to provide an output signal 501G. The angular velocity of the vibrator 2 is calculated from the output signal 501G.

The inverted signal 501E (the sum of the signals 1501E and 2501E) delays in phase from the shifted signal 501D (the signals 1501D and 2501D) due to the inversion amplifier 22. More specifically, the inverted signal 501E (the signals 1501E and 2501E) is not completely inverted from the shifted signal 501D (the signals 1501D and 2501D), and delays by a period T of time from the shifted signal 501D (the signals 1501D and 2501D). The detected signal 501F (the signals 1501F and 2501F) is smoothed to provide the output signal 501G (the signals 1501G and 2501G). The output signal 501G contains the signal 1501E (the signal 501E), an error caused by the period T, hence preventing the angular velocity of the vibrator 2 from being detected accurately.

SUMMARY OF THE INVENTION

An angular velocity sensor includes a vibrator vibrating, first and second differential circuits for outputting first and second difference signals, respectively, and a synchronous detector circuit for synchronously detecting the first and second difference signals. First and second sensors outputs first and second detection signals in response to a distortion produced due to an inertial force. The second detection signal has a phase reverse to a phase of the first detection signal. The first difference signal corresponds to a difference provided by subtracting the first detection signal from the second detection signal. The second difference signal corresponds to a difference provided by subtracting the second detection signal from the first detection signal.

This angular velocity sensor detects an angular velocity of the vibrator accurately.

REFERENCE NUMERALS

32 Vibrator
32A Vibrator Element
40 Sensor (First Sensor)
41 Base
42 Sensor (Second Sensor)
43A Arm (First Arm)
43B Arm (Second Arm)
44 Monitor
48 Differential Circuit (First Differential Circuit)
49 Differential Circuit (Second Differential Circuit)
50 Phase Shifter
54 Synchronous Detector Circuit
101D Differential Signal
101E Differential Signal
101H Detection Signal
101J Detection Signal

DETAIL DESCRIPTION OF THE PREFERRED EMBODIMENT

Figure 1:
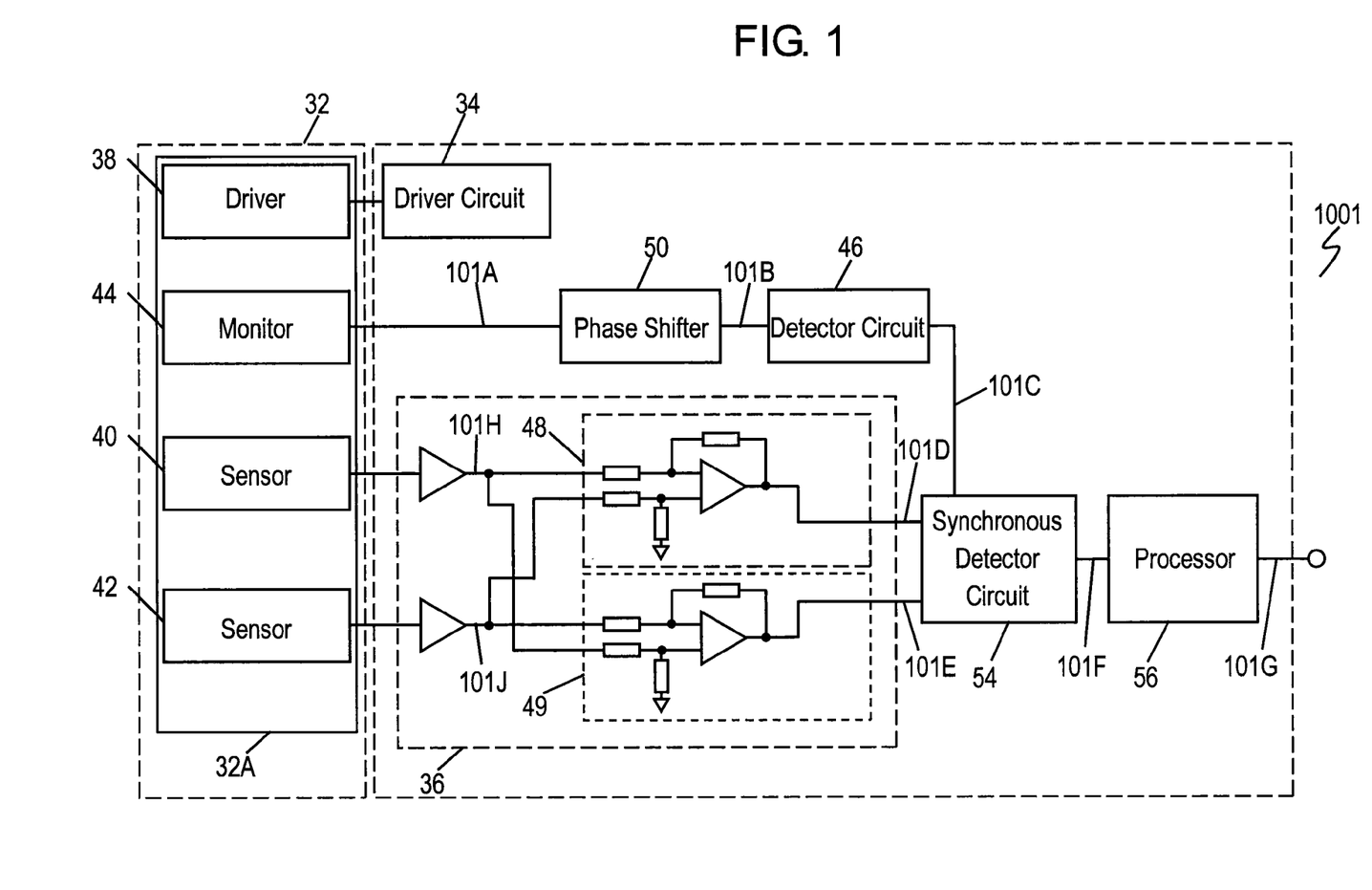
FIG. 1 is a block diagram of an angular velocity sensor according to an exemplary embodiment of the present invention.
Figure 2A:
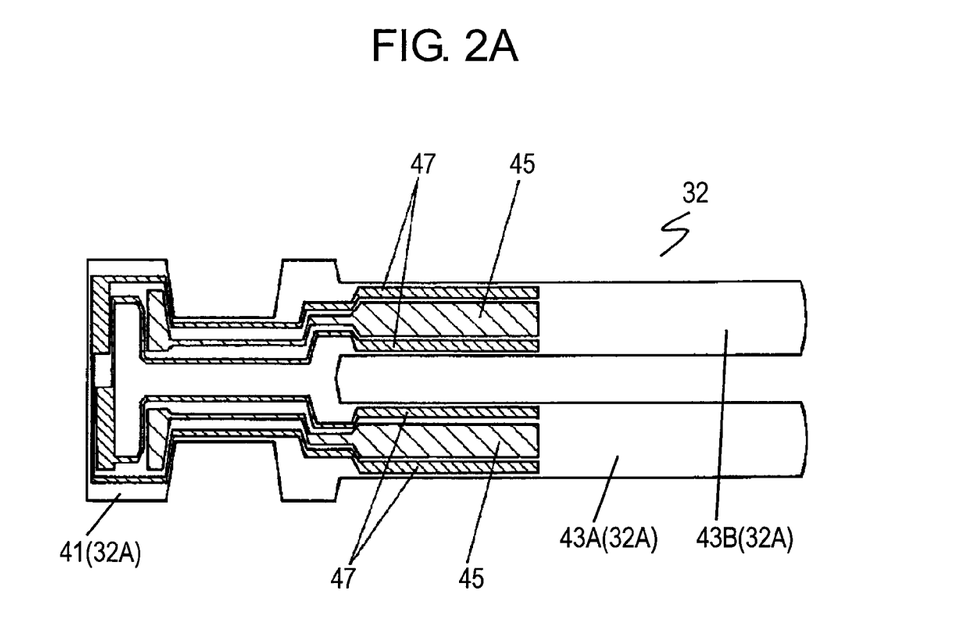
FIG. 2A is a plan view of a vibrator of the angular velocity sensor according to the embodiment.
Figure 2B:
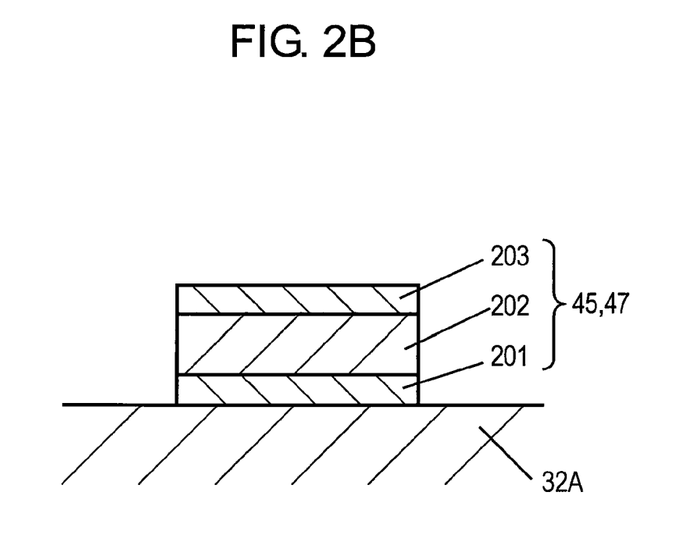
FIG. 2B is a cross sectional view of the vibrator of the angular velocity sensor according to the embodiment.
Figure 3:
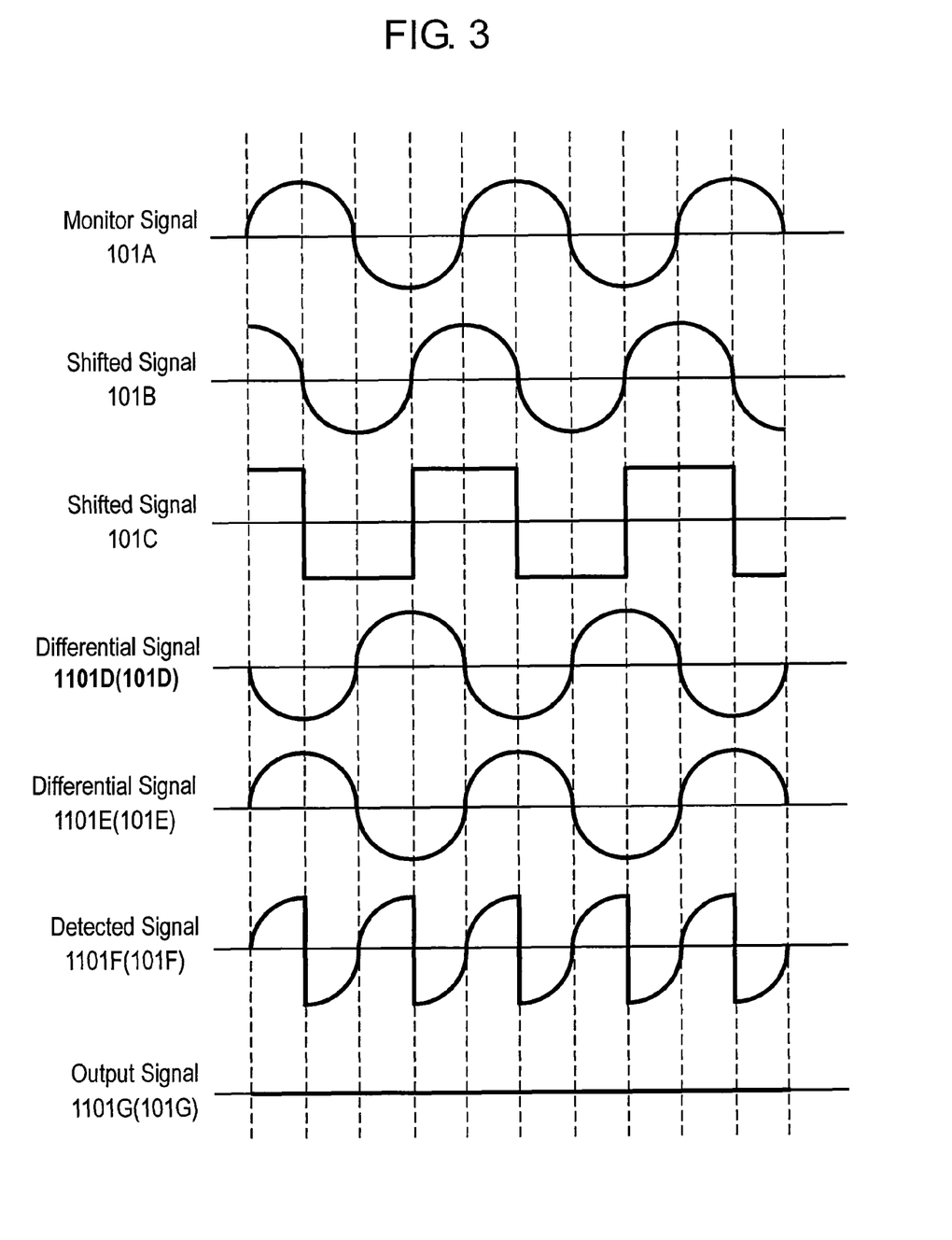
FIG. 3 illustrates the waveforms of signals of the angular velocity sensor according to the embodiment.
Figure 4:
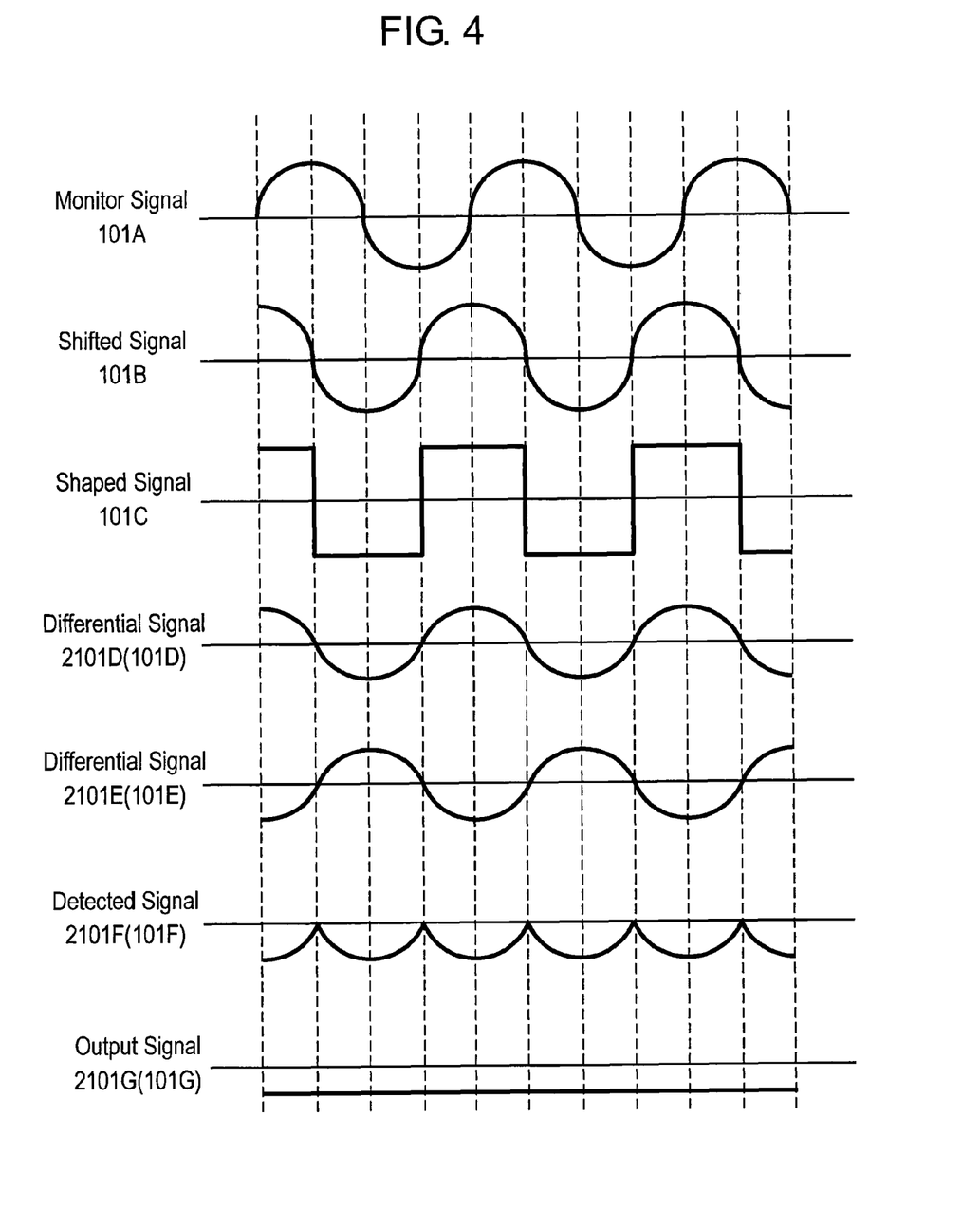
FIG. 4 illustrates the waveforms of signals of the angular velocity sensor according to the embodiment.

FIG. 1 is a block diagram of an angular velocity sensor 1001 according to an exemplary embodiment of the present invention. FIGS. 2A and 2B are a plan view and a cross sectional view of a vibrator 32 of the angular velocity sensor 1001, respectively. FIGS. 3 and 4 illustrate the waveforms of signals of the angular velocity sensor 1001.

The angular velocity sensor 1001 includes the vibrator 32, a driver circuit 34 for vibrating the vibrator 32, and a detector circuit 36 for detecting a distortion produced in the vibrator 32. The vibrator 32 has any of various shapes, such as a tuning-fork shape, an H-shape, a T-shape, and a reed shape. When the vibrator 32 rotates while vibrating, a Coriolis force, an inertial force, produced by the vibration and rotation provides the vibrator 32 with a distortion. The angular velocity sensor 101 detects the distortion electrically to calculate the angular velocity of the vibrator 32.

The vibrator 32 includes a vibrator element 32A mechanically vibrating, a driver 38, sensors 40 and 42, and a monitor 44. The driver 38 causes the vibrator element 32A to vibrate in response to a driving signal supplied from the driver circuit 34. The sensors 40 and 42 outputs, to the detector circuit 36, detection signals 101H and 101J representing the distortion produced by the Coriolis force. The monitor 44 outputs a monitor signal 101A corresponding to the vibration of the vibrator element 32A. As shown in FIG. 2A, the vibrator element 32A made of a silicon substrate includes a base 41 and arms 43A and 43B joined to the base 41, thus having a tuning fork shape. Driving electrodes 45 and sensing electrodes 47 functioning as the driver 38 and the sensors 40 and 42, respectively, are provided on the vibrator element 32A. As shown in FIG. 2B, each of the driving electrodes 45 and the sensing electrodes 47 includes a conductive layer 201 made of metal, such as Ag or Au, provided on the vibrator element 32A, a piezoelectric layer 202 made of lead zirconium titanate (PZT) provided on the conductive layer 201, and a conductive layer 203 made of metal, such as Ag or Au, provided on the piezoelectric layer 202. The monitor 44 also includes electrodes identical to those of the driver 38 and the sensors 40 and 42. The driver 38 is provided on the arms 43A and 43B for vibrating the vibrator 32 along a direction 32B which the arms 43A and 43B moves in or and which the arms 43A and 43B are aligned in.

The driver circuit 34 includes an amplifier having an automatic gain control function for controlling a driving voltage supplied to the driver 38 (between the electrodes 45) in order to vibrate the vibrator 32 (the vibrator element 32A) at a constant amplitude. The detector circuit 36 includes a differential circuit and an integral circuit for processing detection signals 101H and 101J output from the sensing electrodes 47 due to the distortion produced in the vibrator 32 by a Coriolis force.

The monitor 44 monitors the vibration of the vibrator 32 (the vibrator element 32A) and outputs a monitor signal 101A in response to the displacements of the arms 43A, 43B of the vibrator 32. A phase shifter 50 causes the monitor signal 101A to shift (delay) in phase by 90 degrees shift (or delayed) to output a shifted signal 101B. A detector 46 detects the shifted signal 101B to shape the signal 101B into a square waveform which has two, high and low, levels and outputs it as a shaped signal 101C.

The sensors 40 and 42 are mounted on the arms 43A and 43B, respectively. Detection signals 101H and 101J output from the sensors 40 and 42 has phases reverse to each other, thus being inverted to each other. The detection signals 101H and 101J being inverted to each other are input to differential circuits 48 and 49, respectively. The differential circuit 48 outputs a differential signal 101D, the difference provided by subtracting the detection signal 101H from the detection signal 101J. The differential circuit 49 outputs a differential signal 101E, the difference provided by subtracting the detection signal 101J from the detection signal 101H. This structure prevents the difference signals 101D and 101E from having different phases, thus allowing the signals 101D and 101E to have waveforms reversed completely to each other.

The difference signals 101D and 101E are synchronously detected with reference to the shaped signal 101C by a synchronous detector circuit 54 to provide a detected signal 101F. In the angular velocity sensor 1001 according to the embodiment, when the shaped signal 101C is at the high level, the synchronous detector circuit 54 outputs the difference signal 101E as the detected signal 101F. When the shaped signal 101C is at the low level, the detector circuit 54 outputs the difference signal 101D as the detected signal 101F. The detected signal 101F is then smoothed by a processor 56 to provide an output signal 101G. The angular velocity of the vibrator 32 is calculated from the output signal 101G.

The detection signals 101H and 101J contain distortion components representing the distortion produced in the vibrator 32 due to the Coriolis force, and noise components. As the noise components have been removed from the detection signals 101H and 101J, the angular velocity is calculated based on only the distortion components.

FIG. 3 illustrates the waveforms of the signals 101A to 101C and signals 1101D to 1101G which are carried in the noise components of the angular sensor 1001. FIG. 4 illustrates the waveforms of the signals 101A to 101C and signals 2101D to 2101G which are carried in the distortion components of the angular sensor 1001. Signals 101D to 101G are the sums of the signals 1101D to 1101G and the signals 2101D to 2101G, respectively.

The detection signals 101H and 101J has phase reversed to each other. The difference signal 101D is provided by subtracting the detection signal 101H from the detection signal 101J while the difference signal 101E is provided by subtracting the detection signal 101J from the detection signal 101H. This prevents the difference signals 101D and 101E from having different phases, thus allowing the signals 101D and 101E to be reversed to each other.

The difference signals 101D and 101E are synchronously detected with reference to the shaped signal 101C, and thereby, prevent the output signal 101G from containing an error caused by the phase difference, hence the angular velocity of the vibrator 32 to be calculated accurately based on the output signal 101G.

INDUSTRIAL APPLICABILITY

An angular velocity sensor according to the present invention detects an angular velocity of the vibrator accurately, and is useful for various electronic devices detecting angular velocities.

The invention claimed is:

1. An angular velocity sensor comprising:
   a vibrator including
      a first sensor for outputting a first detection signal in response to a distortion produced due to an inertial force, and
      a second sensor for outputting a second detection signal in response to the distortion produced due to the inertial force, the second detection signal having a phase reverse to a phase of the first detection signal;

a first differential circuit for outputting a first difference signal corresponding to a difference provided by subtracting the first detection signal from the second detection signal;

a second differential circuit for outputting a second difference signal corresponding to a difference provided by subtracting the second detection signal from the first detection signal; and a synchronous detector circuit for synchronously detecting the first difference signal and the second difference signal.

2. The angular velocity sensor according to claim 1, wherein the vibrator further includes a vibrator element, a driver circuit for vibrating the vibrator element, and a monitor for outputting a monitor signal in response to the vibration of the vibrator element, and the synchronous detector circuit synchronously detects the first difference signal and the second difference signal with reference to the monitor signal.

3. The angular velocity sensor according to claim 2, further comprising a phase shifter for outputting a shifted signal provided by shifting the monitor signal in phase, wherein the synchronous detector circuit synchronously detects the first difference signal and the second difference signal with reference to the shifted signal.

4. The angular velocity sensor according to claim 2, wherein the vibrator element has a tuning fork shape and includes a base, a first arm joined to the stationary base and having the monitor and the first sensor mounted thereon, and a second arm joined to the base and having the monitor and the second sensor mounted thereon.

5. The angular velocity sensor according to claim 1, wherein the vibrator has a tuning fork shape and includes a base, a first arm joined to the stationary base and having the monitor and the first sensor mounted thereon, and a second arm joined to the base and having the monitor and the second sensor mounted thereon.

* * * * *